United States Patent [19]
Toole et al.

[11] 3,851,641
[45] Dec. 3, 1974

[54] METHOD AND APPARATUS FOR DETERMINING INTERNAL IMPEDANCE OF ANIMAL BODY PART

[76] Inventors: Joseph G. Toole, 1492 Rolshead Dr., San Jose, Calif. 95125; Wade H. Foy, 214 E. Edith Ave., Los Altos, Calif. 94022

[22] Filed: Nov. 29, 1973

[21] Appl. No.: 420,186

[52] U.S. Cl........ 128/2.1 Z, 128/2.05 V, 324/57 R, 324/71 R
[51] Int. Cl............................................ A61b 5/05
[58] Field of Search......... 128/2.1 Z, 2.1 R, 2.05 V; 324/57 R, 71 R

[56] References Cited
UNITED STATES PATENTS

| | | | |
|---|---|---|---|
| 3,085,566 | 4/1963 | Tolles | 128/2.1 Z |
| 3,316,896 | 5/1967 | Thomasset | 128/2.1 Z |
| 3,320,946 | 5/1967 | Dethloff | 128/2.1 Z |
| 3,750,649 | 8/1973 | Severinghaus | 128/2.1 Z |

*Primary Examiner*—Richard A. Gaudet
*Assistant Examiner*—Lee S. Cohen
*Attorney, Agent, or Firm*—Townsend and Townsend

[57] ABSTRACT

Apparatus and a method for determining the internal impedance of a portion of an animal body. Two electrical currents of different frequencies are passed through the body portion and the voltage across the body portion corresponding to each current flow is sensed. In-phase coherent detection is performed to remove the out-of-phase signal components and the resulting in-phase voltage signals are subtracted from each other to yield a measure of only the internal impedance of the body portion. The invention is especially suitable for use in measuring the changes in the amount of fluid in the human lung.

21 Claims, 5 Drawing Figures

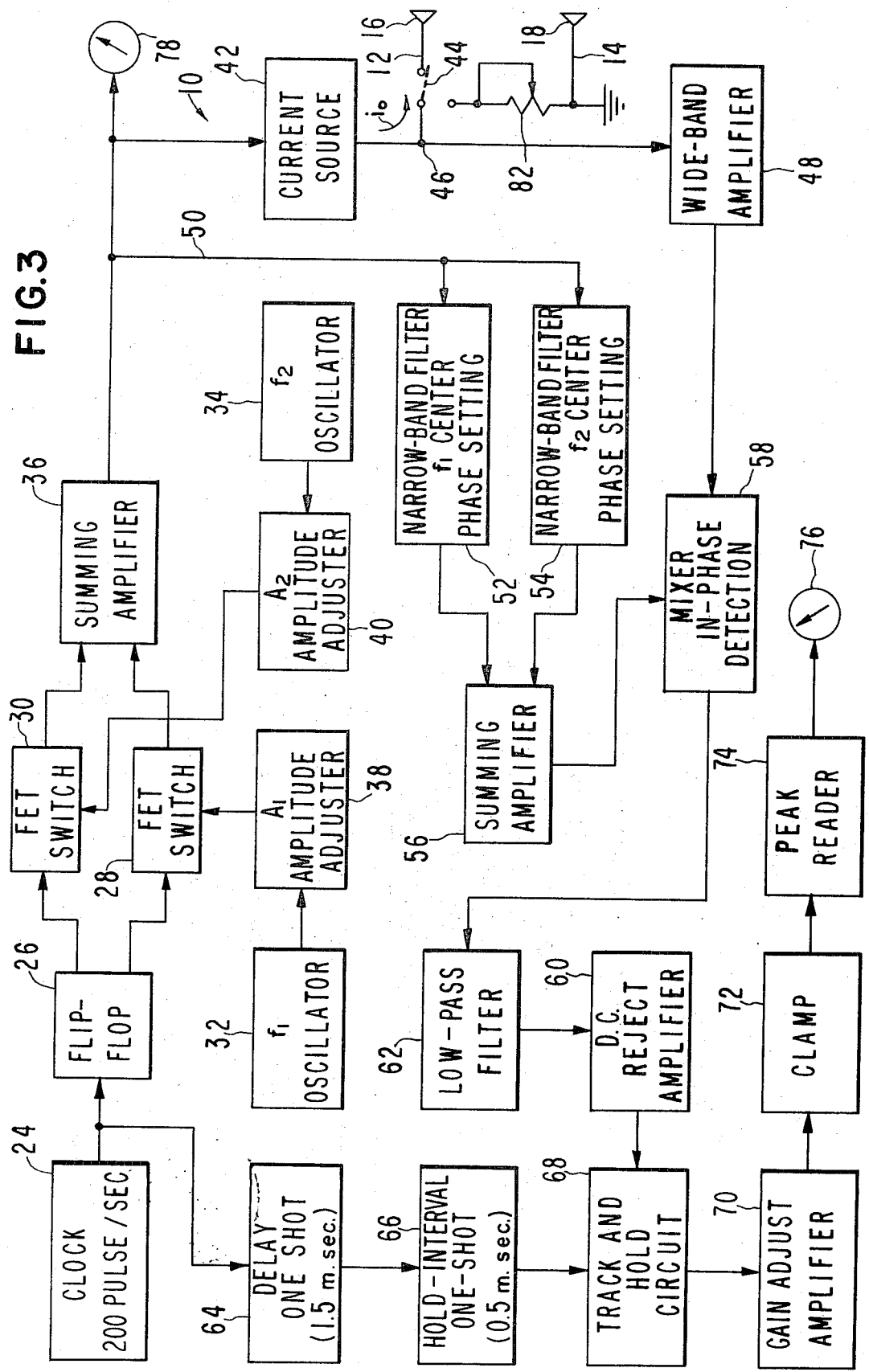

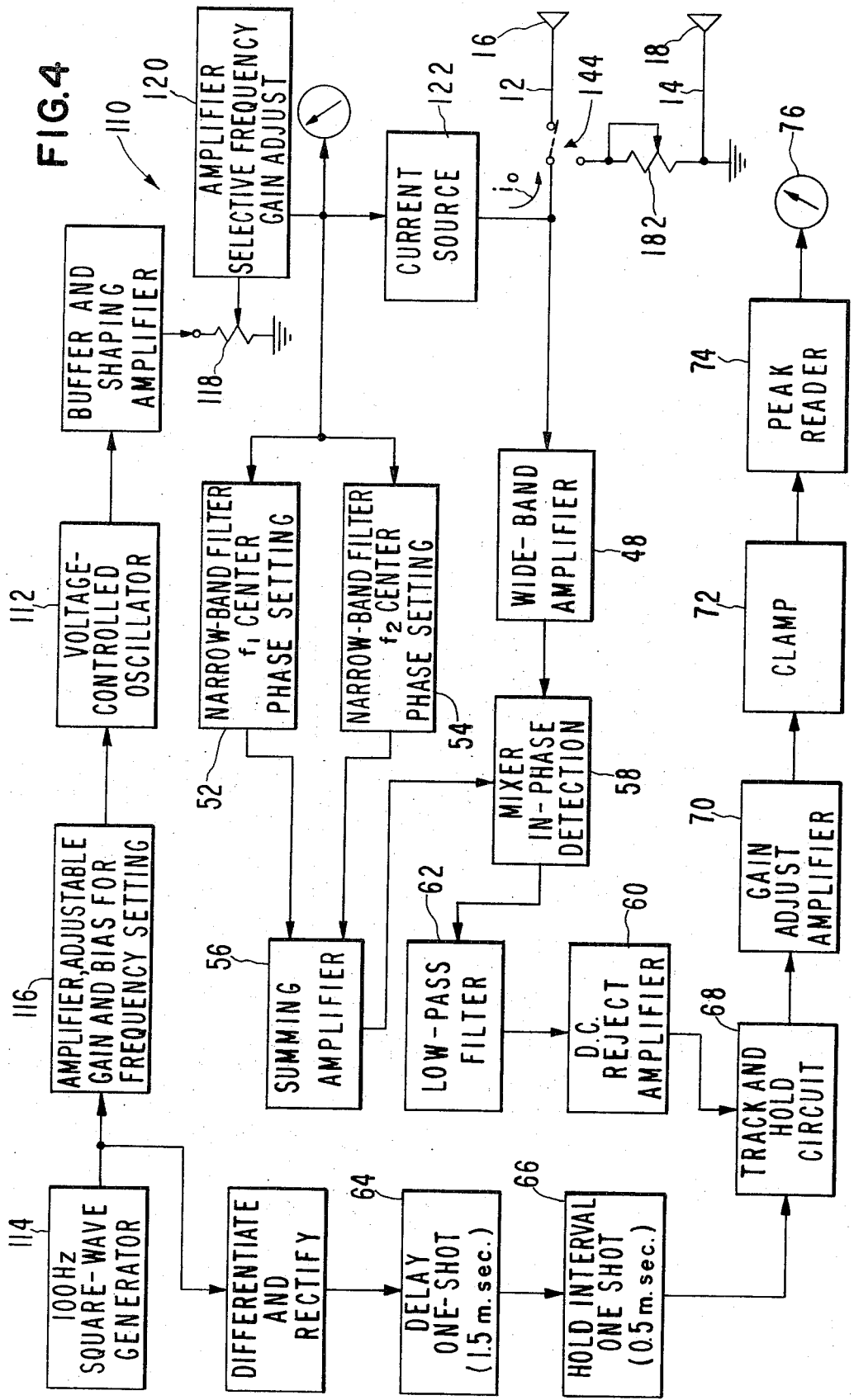

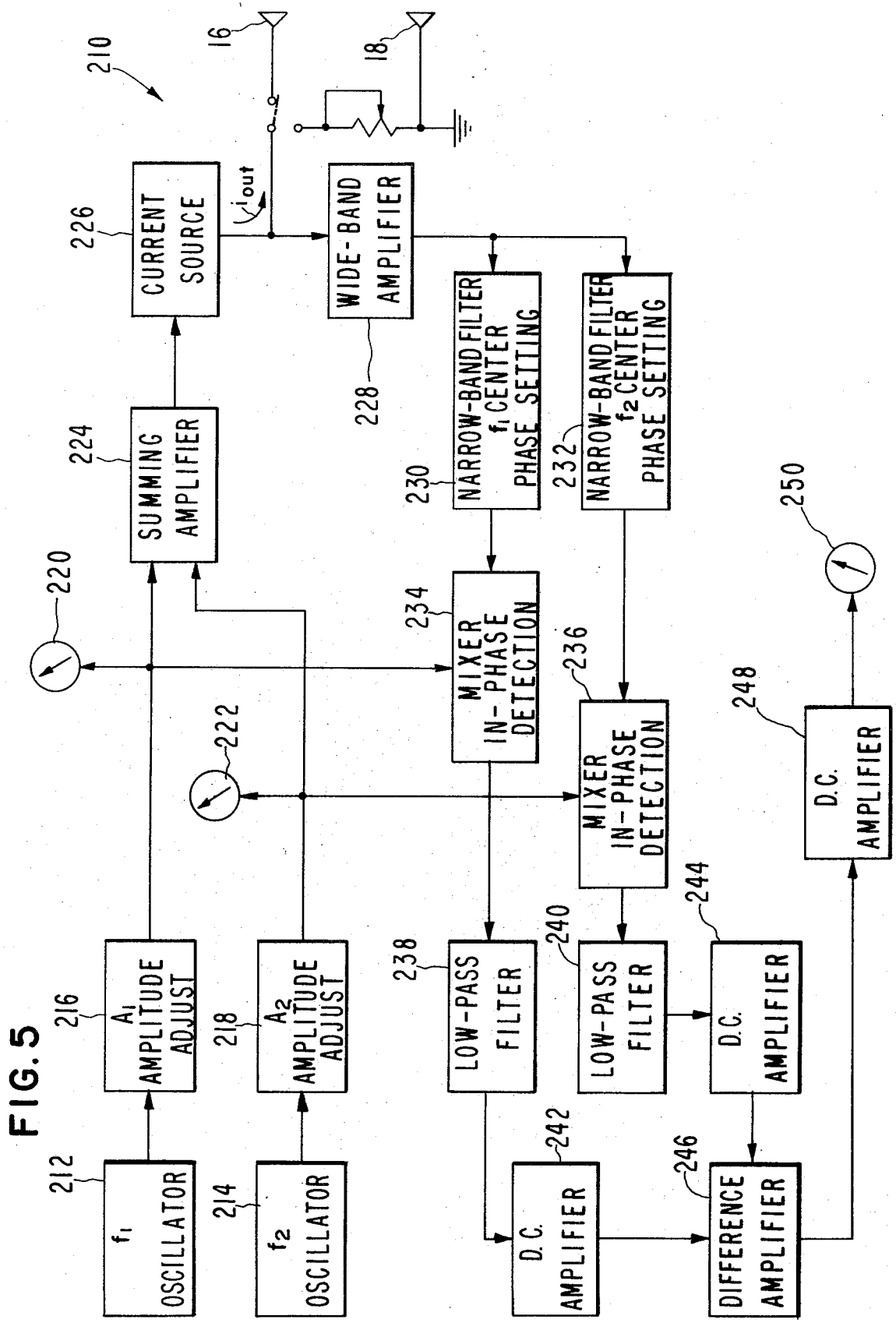

METHOD AND APPARATUS FOR DETERMINING INTERNAL IMPEDANCE OF ANIMAL BODY PART

This invention relates to improvements in the analyses of the functions of animal bodies and, more particularly, to an improved apparatus and method for determining internal impedance of a portion of an animal body.

BACKGROUND OF THE INVENTION

It has been found and verified by a number of different persons in medical research that the impedance of a portion of an animal body behaves like a particular type of electrical circuit model containing resistances and capacitances arranged to provide both an external impedance and an internal impedance. This circuit model is, for instance, discussed in a text entitled, ELECTRICAL IMPEDANCE PLETHYSMOGRAPHY by J. Nyboer, C. C. Thomas Publishing Company, Springfield, Illinois (1959) at pages 20-23. The circuit model has been the basis upon which many medical research workers have determined the total impedance of a body part. Such total impedance across the circuit which is measured in the usual methods of impedance plethysmography has been used for medical studies of variouss types and is quite dependent upon the values of the resistance and capacitance of the external portions of the animal part which is measured and on the properties of the electrode contacts. However, such measurements have been unreliable because the external resistance and capacitance change significantly with certain specific changes such as those due to skin moisture and irritation and those due to the electrodes attached to the skin. Changes in these external parameters give changes in the total impedance of a body portion which are clearly unrelated to change of internal impedance. Thus, any measurements containing external impedance parameters yield unreliable results, thereby minimizing their value as a clinical tool, especially when used in such areas as determining the fluid content changes in the human lung.

When the human lung commences to fill with fluid, the impedance of the lung changes. It is extremely important to determine such change in the fluid content of the lung so as to be able to detect whether a patient is approaching a crisis stage of a particular illness. Conventional methods of measuring impedance are not satisfactory for use in determining changes in the fluid content of the lung because, although the internal impedance of the lung may change due to fluid content changes, the external impedance of the body adjacent to the lung also changes, sometimes even as often as changes in the fluid content of the lung. Any measurement of the change of impedance of the lung would, therfore, be clearly unreliable because one would not know whether the change would be due to either or both the internal lung impedance and the impedance externally of the lung.

SUMMARY OF THE INVENTION

The present invention is directed to an improved apparatus and method for making impedance measurements of a part of an animal body so that the measurements represent relative values of only the internal impedance of the body part, thereby independent of external impedance such as that due to skin resistance and electrode resistance. Thus, a series of such measurements can be used to detect changes in the body part over a certain time interval, such as the increase in fluid content thereof. The invention is especially suitable for use in determining changes in the fluid content of the human lung to thereby provide an advance warning of the approach of a critical stage in the condition of a patient before such stage is reached. Thus, the invention provides a working tool for a clinician which is readily and safely adapted for use with all patients yet it provides immediate response and can be used as a monitor over a period of time to check the change in condition of a patient without affecting such condition.

The invention utilizes a system which operates to provide a measure of the relative value of the impedance of a body part while eliminating the contribution due to impedances external to the body part, such external impedances typically being due to skin moisture and irritation and to electrode construction. To achieve this, the invention operates to direct two currents of two different frequencies successively through the body part whose condition or function is to be measured. The voltage drop across the body part corresponding to each current is sensed, following which an in-phase detection of the voltage drops of both currents is accomplished to eliminate components thereof contributed by one of the external impedances, namely, the capacitance. The remaining voltage signals are subtracted from each other to eliminate components thereof contributed by the other external impedance, namely, the resistance. The resulting difference signal is directed to an indicator, such as a meter, and the indicator reading provides a relative value of the total internal impedance of the body part without the presence of an external impedance factor. If such measurements are taken at periodic intervals, it is possible, therefore, to detect functional changes in the body part, such as changes in the fluid content thereof since an increase or decrease of the fluid content in the body part will cause measurable impedance changes therein. When applied to the lung, the changes can be significant in determining whether or not a patient is approaching a critical respiratory stage so that, upon receipt of such information, steps can be taken to alleviate or circumvent the situation.

The primary object of this invention is to provide an improved apparatus and method for determining only the internal electrical impedance of a body part of an animal even though impedances external to the body part are present to thereby permit analyses of changes in the body part to be made which would otherwise not be accomplished because of the inability of conventional methods to separate and distinguish between internal and external impedances of such body part.

Another object of this invention is to provide apparatus and a method of the type described wherein electrical currents at two different frequencies are directed through a body part of an animal whose condition is to be measured, then the resulting voltage signals corresponding to the two currents are sensed and subjected to an in-phase detection following which the in-phase components of the voltage signals are subtracted from each other, whereby the contributions in the voltage signals due to external impedance factors are removed from such signals and a difference signal is developed which provides a relative value solely of the internal impedance of the body part. Thus, when a series of such relative values are sequentially obtained, a curve can be obtained which indicates functional changes in the body part.

Still another object of this invention is to provide apparatus and a method of the aforesaid character, wherein fluid changes in the human lung can be sensed by noting the changes in the internal impedance of the lungs so that the onset of critical stages can be determined before a patient reaches a critical respiratory stage.

Other objects of this invention will become apparent as the following specification progresses, reference being had to the accompanying drawings for illustrations of several embodiments of the invention.

In the drawings:

FIG. 3 is a block diagram of one form of the apparatus of the invention; and

FIGS. 4 and 5 are block diagrams similar to FIG. 3 but showing two other embodiments of the apparatus.

While the system of the present invention is suitable for use in determining physiological and pathological changes of various parts of animal bodies, it will hereinafter be described with respect to the measurement of changes in the amount of fluid in the human lung. The theory of operation of the present invention is based upon the premise that, when an electrical current of low amplitude, less than 2.0 milliamps, and of a frequency in the range of from 10 kHz to 30 mHz, is impressed between the two electrodes attached to spaced locations on the human body, it can be shown that the impedance, both internal and external, appears to behave as if the body part between the electrodes forms an electrical circuit of the type shown in FIG. 1, wherein $R_S$ is the electrode and skin surface resistances; $C_S$ is the skin layer capacitance; $R_i$ is the internal resistance of the body part; and $C_i$ is the internal capacitance of the body part. The total impedance across the aforesaid circuit, when measured by using the usual methods of impedance plethysmography and which has been used for medical studies for various types, is very dependent on the values of $R_S$ and $C_S$. However, these quantities change with changes in skin moisture and skin irritation, and the age of the electrode past used to make electrical contact with the body. Such changes give changes in the total impedance value that are not related to the internal impedance sought to be measured. The present invention is, therefore, directed to a system for indicating the combined impedance of $R_i$ and $C_i$ without being affected by changes in $R_S$ and $C_S$.

Figure 1:
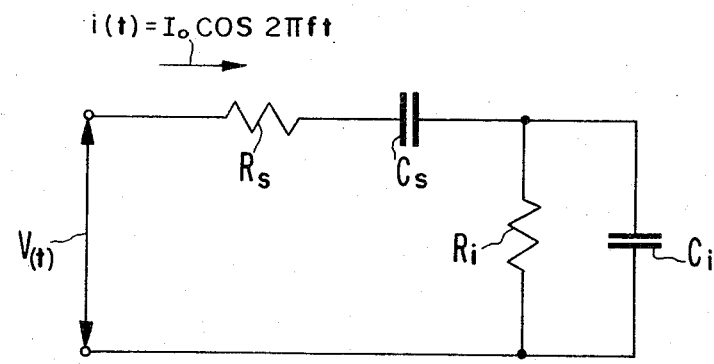
FIG. 1 is a schematic view of a circuit providing a theoretical electrical model simulating the external and internal impedances of any one of a number of body parts of the human body.

The behavior of the circuit of FIG. 1 may be analyzed by assuming that a current to be impressed through the circuit as a function of time, with amplitude $I_0$ and frequency $f$ can be given as follows:

$i(t) = I_0 \cos(2\pi f t)$

The resulting voltage between the electrodes is given as follows:

$$v(t) = I_0 \left[ R_S + \frac{R_i}{1 + (2\pi f R_i C_i)^2} \right] \cos(2\pi f t)$$

$$- I_0 \left[ \frac{1}{2\pi f C_S} + \frac{(2\pi f R_i C_i) R_i}{1 + (2\pi f R_i C_i)^2} \right] \sin(2\pi f t)$$

The foregoing equations, it is possible to measure $R_i$ and $C_i$ without the dependence thereon of $R_s$ and $C_s$ by performing the following steps:

1. Using two current components at different frequencies $f_1$ and $f_2$ applied to the electrodes and therefore through the body part.

2. Performing in-phase coherent detection (i.e., multiplication of the resulting voltage signals by the cosine signal) to remove the out-of-phase (i.e., sine) signal component and thereby to remove the effect of $C_S$.

3. Subtracting the resulting voltage signals at the different frequencies so as to remove the effect of $R_S$.

In performing the second step above, the in-phase components of the two resulting voltages will be given as follows:

$$v_1 = I_0 \left[ R_s + \frac{R_i}{1 + (2\pi f_1 R_i C_i)^2} \right]$$

$$v_2 = I_0 \left[ R_s + \frac{1 + (2\pi f_2 R_i C_i)^2}{R_i} \right]$$

Taking the difference between the two results in the following:

$$v_1 - v_2 = \frac{I_0 [(2\pi f_2)^2 - (2\pi f_1)^2] R_i^3 C_i^2}{[1 + (2\pi f_1 R_i C_i)^2][1 + (2\pi f_2 R_i C_i)^2]}$$

It can be seen that the foregoing result depends directly on $R_i$ and $C_i$ but does not depend on $R_S$ and $C_S$. The difference, therefore, provides a measure of the internal impedance of the body independent of external impedance components.

Figure 2:
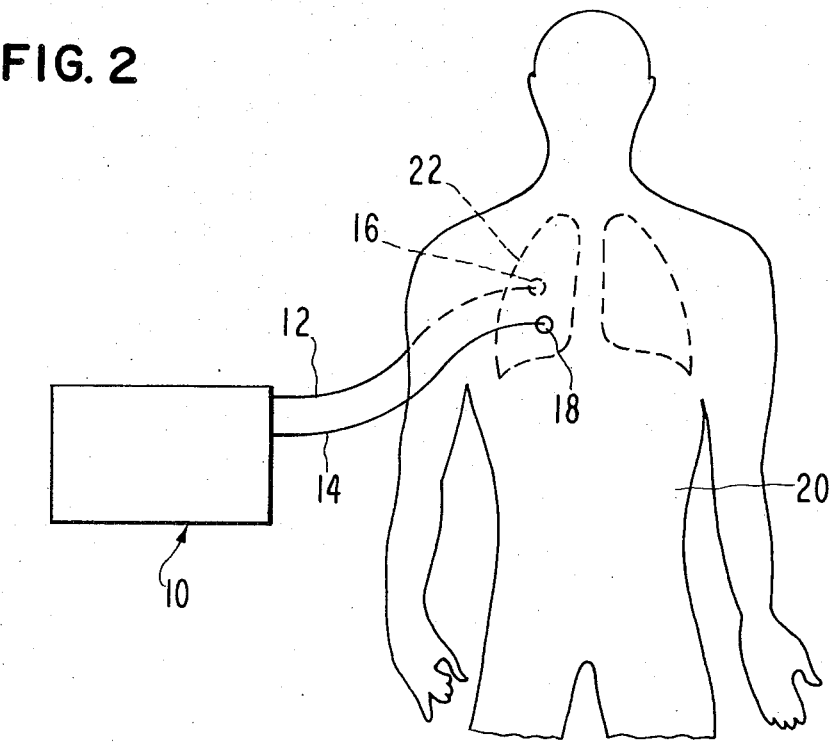
FIG. 2 is a perspective view of a patient and the probes attached to the body of the patient for connecting the apparatus of this invention thereto for measuring fluid content changes in the lung of the patient.

A first embodiment of the apparatus of the present invention utilizes a circuit broadly denoted by the numeral 10. The circuit is adapted to be used with a pair of leads 12 and 14 having electrodes 16 and 18 capable of being attached to the body in a conventional manner (FIG. 2). For purposes of illustration, electrodes 16 and 18 are coupled to the back and front, respectively, of patient 20 in alignment with the lung 22 thereof for use in determining fluid changes in the lung as monitored by apparatus 10 in a manner to be described.

Other electrode positions on the body can be used to get specific results. Thus, in carrying out the teachings of the invention, the two positions of the electrodes shown in FIG. 2 are not to be considered as limiting the scope of the invention.

Circuit 10 includes a clock 24 which provides a trigger pulse periodically, such as every 5 milliseconds. The trigger pulse is applied to a flip-flop 26 which alternately actuates transistor switches 28 and 30, the latter serving to couple the outputs of respective oscillators 32 and 34 alternately to the input of a summing amplifier 36. The signal output of oscillator 32 has a frequency $f_1$ and the signal output of oscillator 34 has a frequency $f_2$. The oscillator output signals are directed to summing amplifier 36 through amplifier adjusters 38 and 40, respectively. Thus, the output of summing amplifier 36 is alternately of frequency $f_1$ and $f_2$ over successive intervals which, for example, are 5 milliseconds in length. The frequency shift signal at the output of summing amplifier 36 is converted proportionately to a current signal $i_o$ by a current source 42 coupled by a single-pole, double-throw switch 44 to electrode 16. Thus, the current is applied to a body part of a patient through the electrodes, electrode 18 being coupled to ground.

The voltage developed across the electrodes is sensed by a wideband amplifier 48. The patient in the electrodes generally exhibits a total impedance of about 500 ohms or less and the input impedance of wideband amplifier 48 must be much greater than this, such as at least 10 times as great. Typically, such imput impedance will be about 5000 ohms. Also, the band width of wideband amplifier 48 must be wide enough to cover the full range of frequencies from $f_1$ to $f_2$.

The output of summing amplifier 36 is coupled by a lead 50 to the inputs of a pair of narrow band filters 52 and 54 to provide a mixer reference signal, the outputs of filters 52 and 54 being coupled to the input of a summing amplifier 56. The band width of either filter 52 or 54 must be less than the difference of $f_2$ and $f_1$ and each filter must be adjusted so that its phase shift at the mixer exactly matches the phase shift of its frequency $f_1$ or $f_2$ in going through current source 42 and wideband amplifier 48.

The output of amplifier 48 and amplifier 56 are coupled to the input of a mixer 58 for in-phase detection. The resulting output signal of the mixer is amplified by a d.c. rejection amplifier 60 after passing through a low pass filter 62.

The output pulses of clock 24 are used to trigger a delay one-shot multivibrator 64 whose output is coupled to a hold interval one-shot multivibrator 66. The output of one-shot 66 is coupled to a track and hold circuit 68 which also has another input coupled to the output of rejection amplifier 60. The signal from one-shot 66 provides a gating voltage that causes track and hold circuit 68 to sample the signal output from rejection amplifier 60 near the middle of each constant frequency time interval. These samples are amplified in gain adjust amplifier 70, then shifted so that one value is zero by clamp 72, and finally subtracted from each other so that their differences are taken by peak reader 74. A d.c. voltmeter 76 indicates the difference measurement. Care must be exercised in the individual circuit designs to avoid signal distortion by saturation or other non-linearities.

In use, electrodges 16 and 18 are placed on patient 20 and switch 44 is shifted to a first position to couple electrode 16 with current source 42. Amplifiers 38 and 40 are then adjusted to pre-set the amplitude of $i_0$ which is indicated by a meter 78. Usually, $i_0$ is set to about 1 milliamp rms, but the value must be set precisely for repeat measurements on a given patient.

Switch 44 is then shifted to a second position to connect a variable resistor 82 between current source 42 and ground. The resistance is adjusted to approximately the value of the total subject impedance and the relative amplitudes of amplifiers 38 and 40 are adjusted, keeping meter reading of meter 78 constant, to give zero output voltage indicated by meter 76. Finally, switch 44 is shifted back to the first position and the resulting reading at meter 76 is the difference impedance measurement.

The embodiment of the circuit shown in FIG. 4 is denoted by the numeral 110 and is similar to circuit 10 (FIG. 3) except that circuit 110 includes a simple voltage-controlled oscillator 112 fed from a 100 Hz square wave generator 114 through an amplifier 116 having adjustable gain and bias depending upon the frequency setting. Thus, oscillator 112 is capable of developing frequencies $f_1$ and $f_2$ at successive periodic intervals, such as 5 millisecond intervals. In this case, the two frequencies are relatively close together, such as 26 kHz and 34 kHz, respectively.

The impressed current amplitude is adjusted by a potentiometer 118 and the relative amplitudes of the two frequencies are adjusted by use of an adjustable frequency selective amplifier 120 which drives current source 122 coupled as before to electrodes 16 and 18 by way of the leads 12 and 14, respectively. A switch 144 permits adjustment with the use of a resistor 182 in the manner described above with respect to circuit 10. The remaining part of circuit 110 is essentially the same as that of circuit 10. Thus, identical numerals are used for corresponding elements.

The circuit of FIG. 5, denoted by the numeral 210 shows a way in which the two frequencies $f_1$ and $f_2$ are developed by two independent oscillators 212 and 214 with the frequencies being well separated from each other. The outputs of the oscillators are coupled through amplitude adjusting amplifiers 216 and 218, respectively, the amplitudes of the two frequencies being measured by meters 220 and 222, respectively. The signals are directed to a summing amplifier 224 which feeds a current source 226 coupled to electrodes 16 and 18 in the manner described above with respect to circuits 10 and 110. Circuit 210 does not use frequency shifting; thus, the sampling circuits of circuits 10 and 110 are not necessary and no track and hold portions are necessary as well.

The voltage across probes 16 and 18 is directed to a wideband amplifier 228 which feeds filters 230 and 232 coupled to respective mixers 234 and 236. The outputs of the mixers are coupled through low pass filters 238 and 240 to respective d.c. amplifiers 242 and 244 whereby a difference amplifier 246 provides the necessary value which is sought. The signal from amplifier 246 is amplified by amplifier 248 and registered on a meter 250. Thus, the circuit of 210 requires direct coupled amplifiers at the output which may cause drift in the measurements.

For the three circuits of FIGS. 3–5, the values of $f_1$ and $f_2$ can be determined on an empirical basis. It has been found that the values of $f_1$ and $f_2$ for FIGS. 3 and 5 are 20 kHz and 100 kHz, respectively; whereas, for the circuit of FIG. 4, the values are 26 kHz and 34 kHz, respectively.

We claim:

1. Apparatus for sensing a physiological and pathological change of a body part of an animal comprising: means for generating two electrical currents with each current being at a respective frequency; means coupled with said generating means for connecting the same to an animal body part to permit said currents to be directed therethrough, whereby a voltage corresponding to each current, respectively, will be developed across said body part; a device for detecting the in-phase components of a voltage signal; means coupled with said connecting means for applying each voltage across the body part to said detection device, whereby the output of the detection device is a signal representing the in-phase component of the voltage corresponding to a respective current; means coupled with said detection means for subtracting the magnitude of the in-phase signal corresponding to the current at a first frequency from the in-phase signal corresponding to the current at a second frequency to provide a difference signal; and means coupled with said subtracting means for indicating the difference signal.

2. Apparatus as set forth in claim 1, wherein said detection device comprises a mixer having means for developing a reference signal for each voltage, respectively.

3. Apparatus as set forth in claim 2, wherein said developing means comprises a pair of narrow band filters responsive to said current generating means.

4. Apparatus as set forth in claim 1, wherein said current generating means includes a pair of oscillators having output signals at said respective frequencies, a summing amplifier, and switch means for successively applying the output signals of the oscillators to said summing amplifier to obtain a frequency shift signal therefrom, and a current source responsive to said frequency shift signal, said current source being coupled with said connecting means.

5. Apparatus as set forth in claim 1, wherein said current generating means includes a voltage controlled oscillator operable to successively develop a pair of signals at said respective frequencies, means for selectively adjusting the amplitudes of the signals, and a current source responsive to said adjusting means, said current source being coupled with said connecting means.

6. Apparatus as set forth in claim 1, wherein said current generating means includes a pair of oscillators whose output signals are at said respective frequencies, a summing amplifier coupled to the oscillators to receive the output signals therefrom, and a current source responsive to the output of said summing amplifier, said current source being coupled with said connecting means.

7. Apparatus as set forth in claim 1, wherein said detection device includes a mixer having means for developing a reference signal responsive to said current generating means, there being a wideband amplifier between said mixer and said connecting means.

8. Apparatus as set forth in claim 7, wherein said current generating means includes a pair of oscillators having output signals at said respective frequencies, a summing amplifier responsive to said oscillators to provide a frequency shift signal, said developing means including a pair of narrow-band filters responsive to the frequency shift signal of said summing amplifier.

9. Apparatus as set forth in claim 7, wherein said current generating means includes a voltage controlled oscillator operable to successively develop a pair of signals at said respective frequencies, and means for selectively adjusting the amplitudes of said signals, said developing means including a pair of narrow-band filters responsive to said adjusting means.

10. Apparatus as set forth in claim 7, wherein said current generating means includes a pair of oscillators, means for adjusting the output signals of the oscillators, there being a pair of mixers connected directly to said adjusting means to receive reference signals therefrom, there being a wideband amplifier coupled to said connecting means and responsive to the voltage across the body part corresponding to each current, respectively, and a narrow-band filter for each mixer, respectively, the narrow-band filters connecting said wideband amplifier to each mixer, respectively.

11. Apparatus as set forth in claim 10, wherein said subtracting means includes a difference amplifier having a pair of inputs, there being a low-pass filter coupling each mixer, respectively, with an input of said difference amplifier.

12. Apparatus as set forth in claim 7, wherein said subtracting means includes a track and hold circuit, means responsive to said generating means for providing a gate signal for said track and hold circuit, a clamp for shifting one of the outputs of the track and hold circuit to a predetermined value, and a peak reader for taking the difference of the amplitudes of the outputs of said track and hold circuit.

13. A method for sensing a physiological and pathological change of a body part of an animal comprising: directing two electrical currents at respective frequencies through the body part during a first time interval to develop a voltage signal across the body part corresponding to each current, respectively; detecting the in-phase component of each of the voltage signals; subtracting the in-phase components of the voltage signals from each other to provide a difference signal, and repeating the directing, detecting and subtracting steps at a second time interval spaced from the first time interval to provide a trend which establishes said functional change.

14. A method as set forth in claim 13, wherein the currents are applied successively to the body part.

15. A method as set forth in claim 13, wherein said detecting step includes generating a reference signal corresponding to each current, respectively, and mixing each reference signal with the corresponding voltage signal to provide an inphase component signal.

16. A method as set forth in claim 13, wherein each voltage signal is amplified before said detecting step.

17. A method as set forth in claim 13, wherein said directing step includes adjusting the amplitudes of each current to a predetermined value.

18. Apparatus for sensing fluid content changes in the human being comprising: means for generating two electrical currents with each current being at a respective frequency; means coupled with said generating means for connecting the same to the human body at locations to permit said currents to be directed through the lung, whereby a voltage corresponding to each current, respectively, will be developed across the body portion containing the lung; a device for detecting the in-phase components of a voltage signal; means coupled with said connecting means for applying each voltage across said body portion to said detection device, whereby the output of the detection device is a signal representing the in-phase component of the voltage corresponding to the respective current; means coupled with said detection means for subtracting the magnitude of the in-phase signal corresponding to the current at a first frequency from the in-phase signal corresponding to the current at a second frequency to provide a difference signal; and means coupled with said subtracting means for indicating the difference signal.

19. Apparatus as set forth in claim 18, wherein the frequencies of said currents are in the range of 20 kHz and 100 kHz.

20. Apparatus as set forth in claim 18 wherein the frequencies of said currents is in the range of 20 kHz and 34 kHz.

21. A method for sensing a fluid content change in the human lung comprising: directing two electrical currents at respective frequencies through the body portion containing the lung during a first time interval to develop a voltage signal across the body portion corresponding to each current, respectively; detecting the in-phase component of each of the voltage signals; subtracting the in-phase components of the voltage signals from each other to provide a difference signal; and repeating the directing, detecting and subtracting steps at a second time interval spaced from the first time interval to provide a trend which establishes said change.

* * * * *